Sept. 11, 1945.  J. F. BRANDT ET AL  2,384,528
OPTICAL INSTRUMENT
Filed April 7, 1943

JOHN F. BRANDT
RAYMOND F.E. STEGEMAN
INVENTORS

BY

ATTORNEYS

Patented Sept. 11, 1945

2,384,528

UNITED STATES PATENT OFFICE 2,384,528

OPTICAL INSTRUMENT

John F. Brandt, Irondequoit, and Raymond F. E. Stegeman, Rochester, N. Y., assignors to Bausch & Lomb Optical Company, Rochester, N. Y., a corporation of New York Application April 7, 1943, Serial No. 482,106

6 Claims. (Cl. 88—39)

The present invention relates to optical instruments and more particularly to hand magnifiers or reading glasses provided with a source of illumination to facilitate their use under adverse light conditions, and having means for permitting illumination on either side of a magnifying lens.

In illuminated magnifiers heretofore proposed, the light source has been so mounted relative to the lens that the magnifier could not be used except in the one position in which the light rays were directed outwardly of one side of the lens and onto the field to be examined. These prior devices, although they would illuminate an object being examined, were objectionable in that care had to be taken in the use thereof to insure that the magnifier was held in the correct relationship to the object for, if the magnifier was not properly held, the light rays would strike the eyes of the user.

In the magnifier of the present invention, this objection has been obviated for no care need be taken to insure that the same is properly disposed in relation to the object undergoing examination, in that, the present invention provides means for selectively illuminating an object placed on either side of the lens of the magnifier. In the embodiment of the invention now preferred, the light source is carried within a chamber formed internally of the lens holder, the latter being provided with light passages leading from the chamber to opposite surfaces thereof so that light may be directed to illuminate objects placed on opposite sides of the lens of the magnifier. To prevent light from being directed outwardly of the magnifier on opposite sides thereof at the same time, the lens holder carries a reflector shield which is selectively movable between alternate positions in which the same selectively closes one passage and prevents light from passing therethrough, thereby insuring illumination of the object on one side and shielding the eyes of the user on the other side.

While the above illuminated magnifier is to be taken as the embodiment of our invention, it is also to be noted that the structure of the magnifier has certain features worthy of being given consideration as lending to the efficiency and utility of the magnifier in use. As can be seen from the drawing, the magnifier has a handle angularly projecting from an edge of the lens holder and extending obliquely in relation to the axis of the lens. This feature is important in the use of the magnifier for reading purposes, as the magnifier may be grasped in one hand and, when it is desired to use the other hand for holding the magnifier, the magnifier is turned over in a reversed position and grasped by the other hand. In both cases the handle will be extending outwardly so that it may be held in natural positions of the hand and arm.

Hence, my invention holds for its primary object, the provision of a hand magnifier having means for permitting selective illumination of a field on either side of a magnifying lens.

Another object of the invention is to provide a hand magnifier having means for selectively illuminating either side of a magnifying lens by directing light from a single light source located in the magnifier handle.

These and other objects and advantages reside in certain novel features of the construction, arrangement, and combination of parts as will hereinafter be more fully set forth and pointed out in the appended claims.

Figure 1:
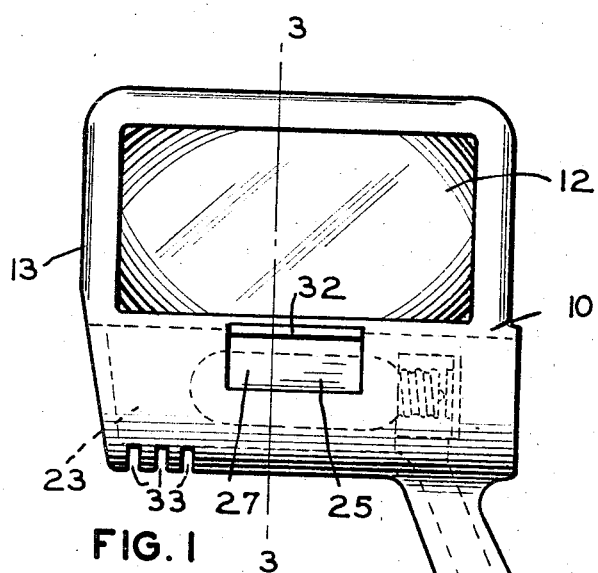
Fig. 1 is a plan view of the device.
Figure 3:
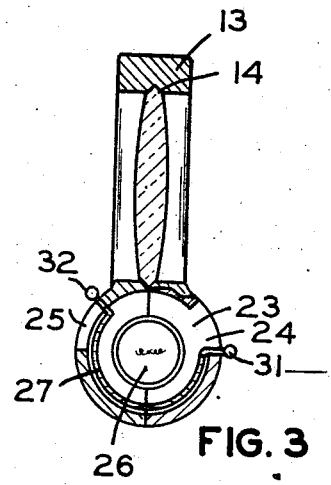
Fig. 3 is a sectional view taken on the line 3—3 of Fig. 1.
Figure 2:
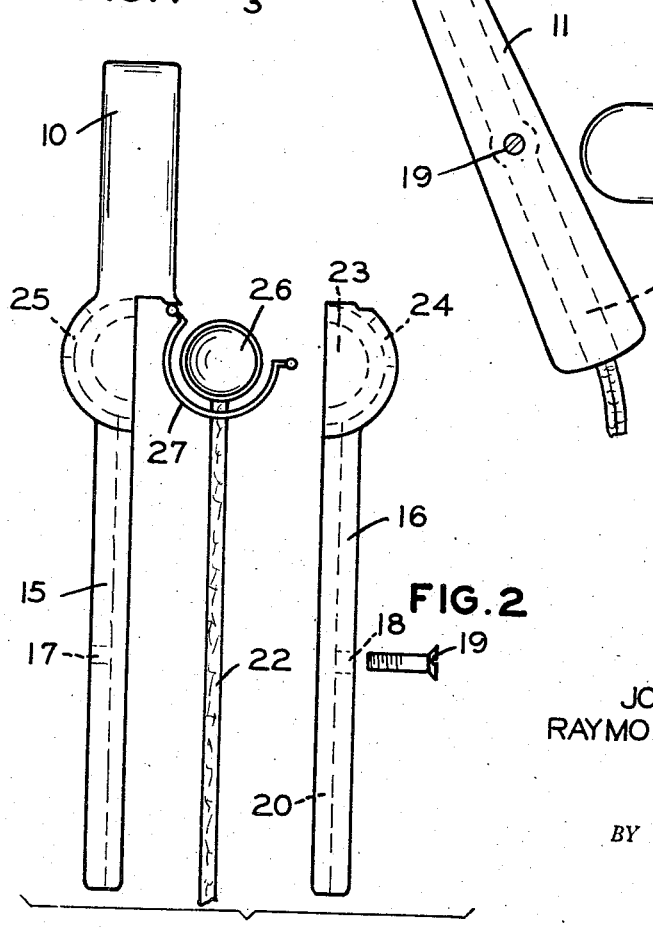
Fig. 2 is an exploded view of the device.

In the embodiment of the invention illustrated in the drawing, the magnifier comprises a rectangular body 10 having an offset tubular handle 11. The tubular handle 11 angularly projects from an edge of the body 10 and obliquely in relation to the axis of a magnifying lens 12. The rectangular magnifying lens 12 is securely held in place by a rim 13 of the body 10. A groove 14 of the rim 13 is adapted to receive the periphery of the lens 12.

The tubular handle 11 comprises two members 15 and 16, the member 15 being an integral part of the body 10 and the member 16 being separated from the body 10. The members 15 and 16 are secured together to form the handle by means of openings 17 and 18 in their central portions receiving a screw 19. The screw is passed through the opening 18 of the member 16 and engages the threaded opening 17 of the member 15 to secure the members 15 and 16 together to form the handle. The handle 11 is provided with a suitable bore 20 for receiving electric conductors 21 and 22. If desired, the bore 20 in the handle 11 may be so fashioned as to receive an electric battery in place of the electric cords 21 and 22.

Figure 4:
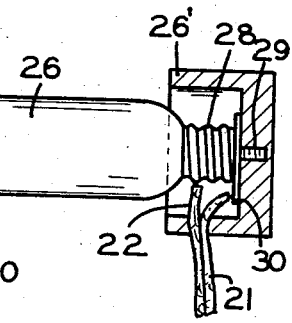
Fig. 4 is a sectional view showing the manner of mounting the light source and the connecting electric conductors.

A cylindrical chamber 23, having rectangular openings 24 and 25 in its side walls, is formed in the upper portion of the handle 11 by the joinder of the handle members 15 and 16 for housing a lamp 26, and a unitary semi-cylindrical reflector shield 27. The lens 12 lies directly above and extends longitudinally of the chamber 23, being separated therefrom by a portion of the rim 13. The lamp 26 is mounted in a separate unit 26' inserted in one side of the chamber 23. The lamp 26 has its base secured into a threaded opening in the lamp socket 28. The bottom portion of the socket has an opening therein to receive a screw 29 and is fastened in the unit 26' in the chamber 23 by the screw passing through an opening in a metallic plate 30 and a threaded opening in the side of the unit 26', as shown in Fig. 4. One of the electric conductors 21 is fastened to the metallic plate 30 and the other electric conductor 22 is secured to the lamp socket 28, thus completing an electric circuit for illumination of the lamp 26.

The unitary semi-cylindrical reflector shield 27 is enclosed within the cylindrical chamber 23 and is adapted to contact the walls of said chamber for guiding and sliding movement circumferentially therealong. The member 27 has an inner light reflecting surface surrounding the lamp 26 so that the light emitted from the lamp 26 is concentrated onto the field through either of two rectangular openings 24 and 25 in the walls of the chamber 23, and an outer surface adapted to be engaged by the walls of the cylindrical chamber 23 and to be moved therein by means of stop members 31 and 32. These stop members 31 and 32 are formed from the transversely bent end portions of the member 27 and act to prevent lateral movement and to limit radial movement of the member 27 in the rectangular openings 24 and 25. The position of the member 27, in each of its two positions, is such as to cover one of the rectangular openings to prevent the emission of light and to open the other rectangular opening to allow the light rays from the lamp 26 to illuminate the field. By shifting the member 27 by either of the stop members 31 and 32, the rays of light of the lamp 26 are shielded from the eyes of the user by closing one of the rectangular openings on one side of the magnifier while they are emitted through the other opening on the other side of the magnifier onto the field. In this manner, either side of the magnifier may be used for observation, with the magnified field illuminated and the eyes protected from the light rays. Due to the concentrated illumination produced by the elongated lamp 26 and the reflecting member 27 through either of the rectangular openings 24 and 25 in the cylindrical chamber 23, the entire magnified field of the rectangular lens 12 is adequately illuminated when the lens is held at reading focus above printed matter or other material. Also, due to the offset handle portion, the user may shift the magnifier conveniently from one hand to the other, thus reversing the lens and by manipulating one of the stop members 31 and 32 illuminate the magnified area while shielding the eyes from the light rays. The heat generated by the lamp 26 is dissipated through the openings 33 and either of the openings 24 or 25 in the chamber 23, depending on which side of the magnifier is being used.

From the foregoing, it will be apparent that we are able to attain the objects of our invention, in that, we have provided a novel magnifier for selectively illuminating the field on either side of a magnifying lens from a single light source located in the magnifier. Various modifications can, of course, be made without departing from the spirit of our invention or the scope of the appended claims.

We claim:

1. An illuminated hand held magnifier comprising a magnifying lens of oblong shape; a holder for said lens; a handle extending obliquely from the holder; a light source carried by said holder and extending along one of the longer edges of the lens; and means for selectively illuminating an object placed on one side or the other of said lens, said means comprising a movable reflector formed with an inner reflecting surface for selectively directing light to said object and preventing light from passing in the opposite direction to shield the eyes of the user from light when looking through said lens at the object.

2. An illuminated hand held magnifier comprising an elongated magnifying lens; a holder for said lens; a handle projecting obliquely from the holder, said holder being formed with a chamber extending longitudinally therethrough along one of the longer edges of the lens and having light passages leading from the exterior of said holder to opposite sides of said chamber; a light source disposed within said chamber and adapted to emit light rays through said passages for illuminating fields as viewed from either side of said magnifier; and a reflector movably mounted in said chamber for directing light through a selected passage, said reflector being so constructed and arranged relative to said chamber and the passages leading thereto that the reflector, when moved to direct light through the selected passage, closes the other of said passages.

3. An illuminated hand held magnifier comprising an elongated magnifying lens; a holder for said lens; a handle extending obliquely from the holder; an elongated light source; a cylindrical chamber formed within said holder and extending along one of the longer sides of the lens; means for mounting said light source within said chamber, said holder being formed with a pair of light passages leading from opposite surfaces of said lens to opposite sides of said chamber; and means for selectively illuminating an object placed on one side or the other of said lens by directing light from said source to a selected passage leading to the side of said lens adjacent said object, said means comprising a hollow cylindrical member rotatably mounted within said chamber and having a reflecting inner surface and an outer surface adapted to be guidingly engaged by the cylinder wall of said chamber, said member being so constructed and arranged relative to said chamber and passages that the same when rotatably moved to direct light through the selected passage closes the other of said passages.

4. An illuminated hand held magnifier comprising an elongated magnifying lens; a holder for said lens; a handle extending obliquely from the holder; an elongated light source; a cylindrical chamber formed within said holder and extending along one of the longer sides of the lens; means for mounting said light source within said chamber, said holder having a pair of passages formed in opposite walls thereof and leading from said chamber to opposite sides of said lens; and means for selectively directing light from said source to a selected passage for illuminating an object placed on one side or the other of said lens, said means comprising a hollow semi-cylinder member rotatably mounted in said chamber and having a reflecting inner surface disposed about said source and an outer surface adapted to be guidingly engaged by the inner cylinder wall of said chamber, said member being so constructed and arranged relative to said chamber and the passages of said holder that the member when moved to direct light through a selective passage prevents light from passing through the other of said passages whereby the eyes of the user are shielded against light from said source.

5. An illuminated hand held magnifier comprising a rectangular magnifying lens; a rectangular body member for holding said lens and having a chamber formed therein adjacent the one edge of said lens, said body member formed with a pair of passages leading from opposite sides of said member adjacent the said edge of said lens to opposite sides of said chamber; a handle carried by said body member and obliquely extending outwardly relative to said lens in the normal use of the magnifier; a light source disposed in said chamber; and means for selectively illuminating an object placed on one side or the other of said lens by directing light from said source to a selective passage, said means comprising a reflector shield surrounding said light source and being so constructed and arranged relative to said chamber and the passages of said body member that said reflector when moved to direct light through a selected passage closes the other of said passages and shields the eyes of the user from the light rays from said source whereby said magnifier can be held by either hand of the user with the handle thereof extending outwardly relative to said lens.

6. An illuminated magnifier comprising a holder, a magnifying lens of oblong shape carried by the holder, a handle projecting obliquely from the holder and lying substantially in the plane of the lens, an elongated light source carried by the holder and extending along one of the longer edges of the lens, and means for selectively directing light rays from said source to one face or the other of the lens.

JOHN F. BRANDT.
RAYMOND F. E. STEGEMAN.